Sept. 19, 1950 V. H. WOOLUMS 2,522,807
METHOD OF FABRICATING FLEXIBLE PANELS
Filed Oct. 30, 1946 2 Sheets-Sheet 1
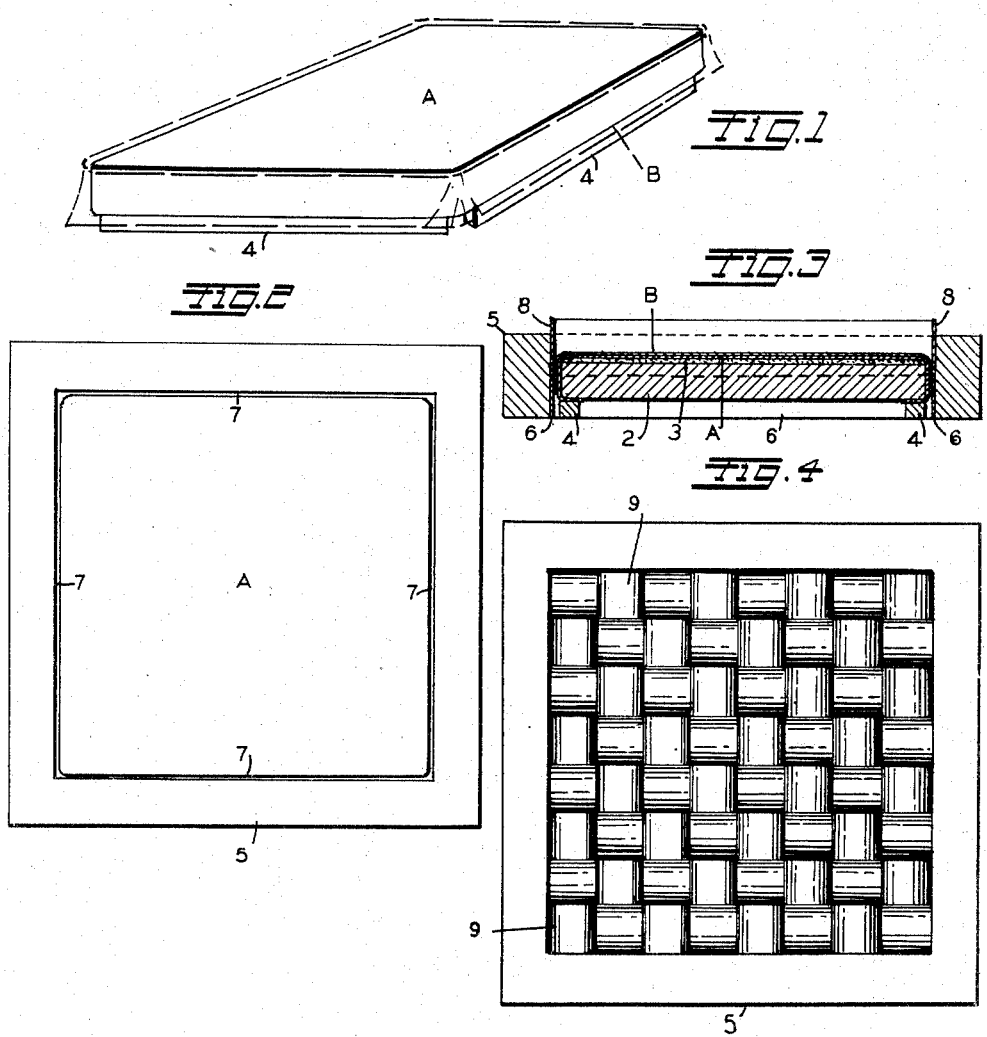
INVENTOR.
VIRGIL H. WOOLUMS
BY Edward M. Fisher Sept. 19, 1950 V. H. WOOLUMS 2,522,807
METHOD OF FABRICATING FLEXIBLE PANELS
Filed Oct. 30, 1946 2 Sheets-Sheet 2

INVENTOR.
VIRGIL H. WOOLUMS
BY Edward M. Fisher

Patented Sept. 19, 1950

2,522,807

UNITED STATES PATENT OFFICE 2,522,807

METHOD OF FABRICATING FLEXIBLE PANELS

Virgil H. Woolums, St. Petersburg, Fla.

Application October 30, 1946, Serial No. 706,685

2 Claims. (Cl. 154—118)

This invention is concerned with the provision of an apparatus for the fabrication of flexible panels and more especially decorative panels which may be used on walls, in the structure of furniture or other types of structure where decoration is desired.

Broadly it is an object of this invention to provide an apparatus, for fabricating flexible panels having a fabric backing, and wherein there is a base member over which there is spread material forming said fabric backing and then stretched thereover by a stretcher frame, this being followed by inserting mask strips around the inner face of said frame in a space, between said base and the inner edge of the frame, to confine the spread of glue or other adhesive material to the exposed surface of said backing material, after which the masks are removed. This is followed by placing the individual blocks; which may be of any suitable material, size or shape to permit fabricating of numerous designs; upon the fabric within the confines of said frame, after which the blocks are compressed to the fabric by means of a clamping plate and after the blocks have adhered to the backing the clamping plate is removed.

This invention resides substantially in the combination, construction and relative arrangement of parts, all in accordance with the disclosure herein.

In the accompanying drawings,

Figure 1 is a perspective view of a base member of a type embodied in this invention, and an indication in dash lines of a fabric panel backing material overlaying said base.

Figure 2 is a plan view thereof with stretcher frame circumambulate to said base.

Figure 3 is a transverse section of said base and frame and showing masking strips inserted in the space between said base and frame.

Figure 4 is a plan view of the stretcher frame and a design formed with one type of block and arranged within the confines thereof.

Figure 5:
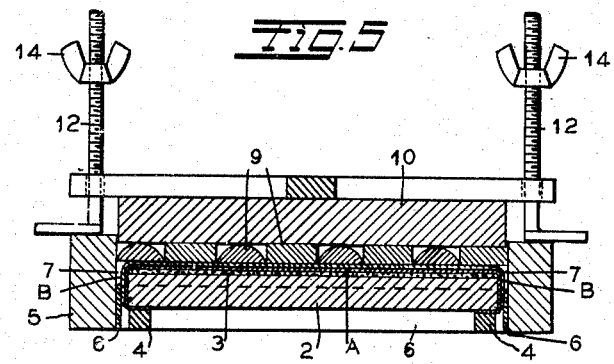
Figure 5 is a transverse section of my invention with a series of arranged blocks and the clamping plate as placed on said blocks prior to release of the frame and thereafter the actual clamping of the plate.

The true nature and manner of use of an apparatus in accordance with this invention will be best understood by a detailed description of the form thereof shown in the drawings in an illustrative sense.

Now referring to the drawings it will be observed that the apparatus includes a base member having a core 2, of wood or any other suitable material, the upper face of which is lightly padded as at 3 and the base then covered with a fabric material A and which is folded over the edges of said core and fastened to the under face of the core by cleats 4 which are made fast to the core by tack, screw or in any other suitable manner.

In the use of this apparatus the fabric backing material B is spread over the above described base member; which has been placed on a suitable flat and level work bench; with the outer edges thereof folded over the edges of said base, a stretcher frame 5 of suitable size and shape is then pressed down over the backing material to circumambulate relation with the base member during which engagement friction strips 6 which line substantially the lower one half of the inner edges of said frame make frictional contact with the backing material and thereby drawing same tight over the base as the frame is pressed downward until the bottom edge thereof is in flush alignment with the bottom edge of the base.

Observation of Figure 2 will teach that when this operation is completed there exists a space 7 of width corresponding to the thickness of the friction strips 6 and vertical thereto. Within this space is placed masking strips 8, which project above the frame, to mask the backing material from glue or other adhesive material which is then flowed or spread on the exposed surface of the backing material, after which said strips are removed and the blocks 9 manually inlaid within the confines of the frame to form a desired decorative pattern and in such manner, as illustrated in the various views, that the entire space between the opposite inner edges of said frame is occupied.

Figure 6:
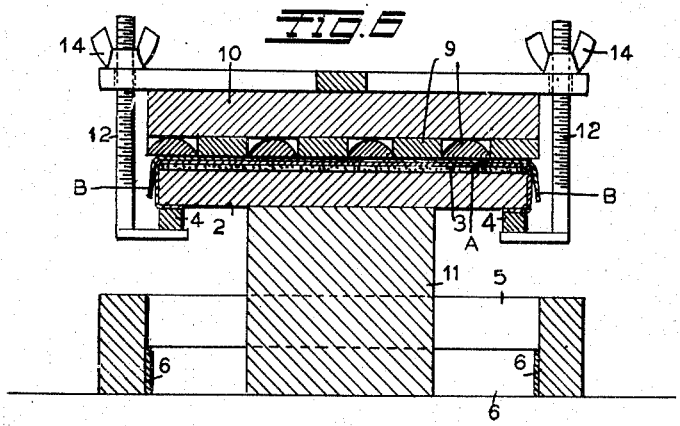
Figure 6 is a view similar to Figure 5 showing the apparatus placed upon a block which permits the frame to be released and dropped and thereafter the clamping means placed in clamping engagement with the base member.
Figure 7:
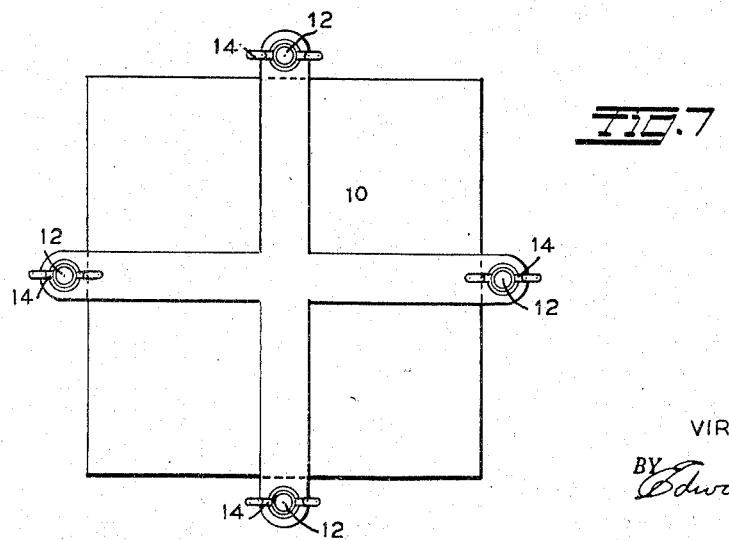
Figure 7 is a plan view of the clamping plate and clamping means thereof as embodied in this invention.

After inlaying of the blocks a clamping plate 10 is placed thereon as illustrated in Figure 5, and the entire apparatus manually raised and placed on a block 11 centermost as to the base core 2 thence thru manual pressure upon the frame same is dropped clear of the base, Figure 6, and the clamping screws 12 which project thru extended arms formed with said plate 10 are hooked to the under face of the base and by means of wing nuts 14 the clamping plate compresses the blocks to the fabric backing and to absorb any variation in size or thickness of the blocks when they are compressed and further assure full undersurface adherence of the blocks to the backing is the funtcion of the padding 3 previously described as forming a part of the base member.

After the blocks are adhered to the backing and the clamps removed it will be observed that the outer edge blocks of the panel have not adhered to the backing at the immediate outer edge for a space back from edges of said panel equal the approximate thickness of the removed masking strips, and which may be further accounted for by viewing Figures 5 and 6 wherein it will be observed that the outer blocks protrude past the backing material and cover space 7. This permits clean trimming of the fabric backing away from the immediate edge of the panel which is an item of value in many respects, as for example in the covering of walls where several panels are used and clean abutment thereof is to be desired, or one edge may be trimmed away from the edge of the panel and the opposite edge trimmed with a slight extension of the backing for overlapping of an abutting panel which has been trimmed in like manner, also this edge clearance is of value to permit sanding of the panel edges and fitting thereof.

From the above description it will be apparent to those skilled in the art that the details of construction illustrated herein may readily be varied without departure from the novel subject matter herein disclosed. I do not therefore, desire to be strictly limited by the disclosure but rather by the claims granted me.

What is claimed is:

1. A method of fabricating flexible panels comprising arranging a fabric backing on a base member, stretching said backing relative to said base, masking the sides of said backing, applying adhesive to the top only of said backing and removing said masking, arranging blocks in a predetermined configuration on said backing so that the marginal blocks extend laterally beyond and are free of the adhesive at their outer edges, and applying pressure to cause said blocks to settle and adhere to the backing, and thereafter removing pressure from said blocks to complete the formation of said flexible panel, having a projecting marginal edge extending therearound.

2. A method of fabricating flexible panels comprising arranging a fabric backing on a base member, stretching said backing relative to said base, masking the sides of said backing, applying adhesive to the top only of said backing and removing said masking, arranging blocks in a predetermined configuration on said backing so that the outer marginal blocks extend laterally beyond and are free of the adhesive at their outer edges, and applying pressure to cause said blocks to settle and adhere to the backing.

VIRGIL H. WOOLUMS.

REFERENCES CITED

The following references are of record in the file of this patent:

UNITED STATES PATENTS

| Number | Name | Date |
|---|---|---|
| 396,073 | Cory | Jan. 15, 1889 |
| 972,754 | Cunninghame | Oct. 11, 1910 |
| 1,485,648 | Van Der Gracht | Mar. 4, 1924 |
| 1,692,920 | Baker | Nov. 27, 1928 |
| 2,106,132 | Feinbloom | Jan. 18, 1938 |
| 2,308,453 | Potchen et al. | Jan. 12, 1943 |